Dec. 18, 1951 — F. W. SCHWINN — 2,579,018
DIRECTED BEAM LIGHT UNIT
Filed April 1, 1948 — 2 SHEETS—SHEET 1
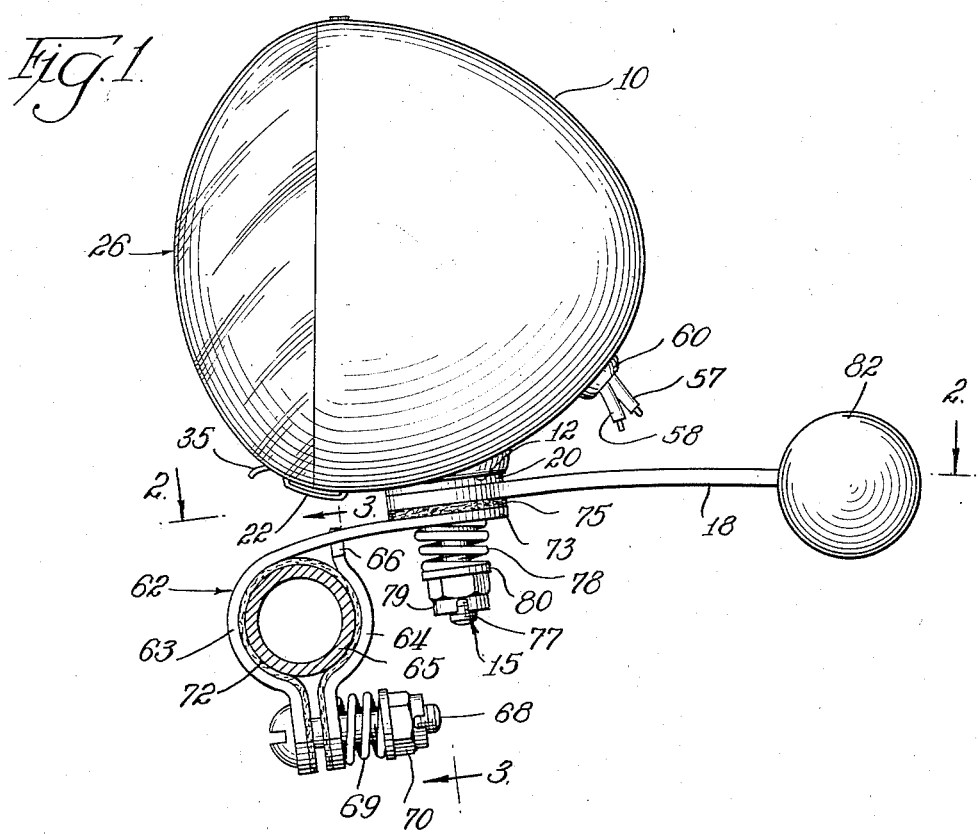
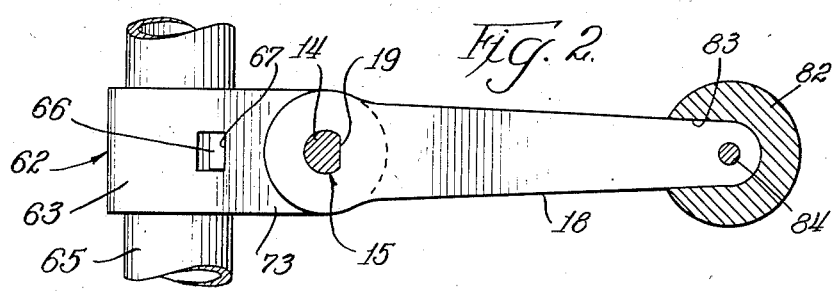
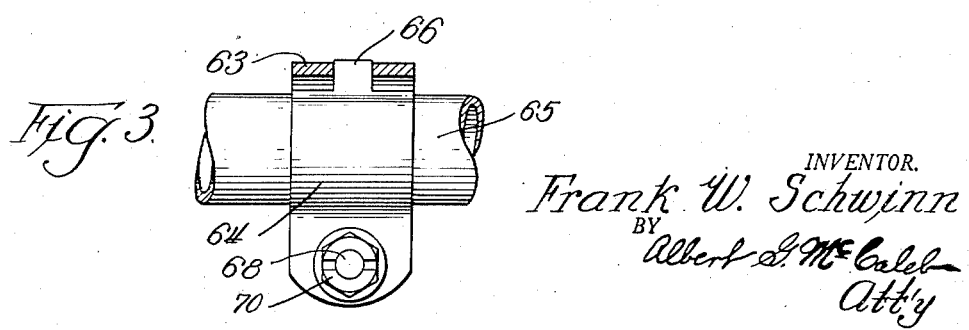
INVENTOR.
Frank W. Schwinn
BY Albert G. McCaleb
Att'y Dec. 18, 1951     F. W. SCHWINN     2,579,018
DIRECTED BEAM LIGHT UNIT Filed April 1, 1948     2 SHEETS—SHEET 2

INVENTOR.
Frank W. Schwinn
BY Albert G. McCaleb
Atty.

Patented Dec. 18, 1951

2,579,018

UNITED STATES PATENT OFFICE 2,579,018

DIRECTED BEAM LIGHT UNIT

Frank W. Schwinn, Chicago, Ill.

Application April 1, 1948, Serial No. 18,437

1 Claim. (Cl. 240—7.55)

This invention relates to directed beam light units of the type adapted to use on vehicles, such as bicycles and the like.

One of the objects of my invention is to provide a light unit embodying a reflector for directing a beam of light and wherein said reflector and a lens form a unitary and closed subassembly adapted to removable mounting in an outer housing.

My invention further has within its purview the provision of a directed beam light unit having a lens made of a molded plastic material and shaped to emit an appreciable amount of light in a direction lateral to the directed beam, so that it is readily observed by others, as well as providing light for the guidance of the user.

It is another object of the invention to provide a directed beam light unit adapted to use on cycles and the like, and which includes a swivel support for effecting adjustment of the light beam about transversely disposed axes, the movement relative to one of said axes being about the part of the cycle or the like which supports the unit.

Another object of this invention is to provide a light unit of the type referred to in which the position of an electric bulb within the unit is adjustable from outside the unit to change the focus of the directed light beam.

For an additional object, my invention contemplates the provision of a directed beam light unit constructed and arranged for support by and adjustment in transverse directions relative to the handle bar of a bicycle or the like by movement of a readily accessible handle.

Other objects and advantages of the invention will be apparent from the following description and the accompanying drawings in which similar characters of reference indicate similar parts throughout the several views.

Figure 4:
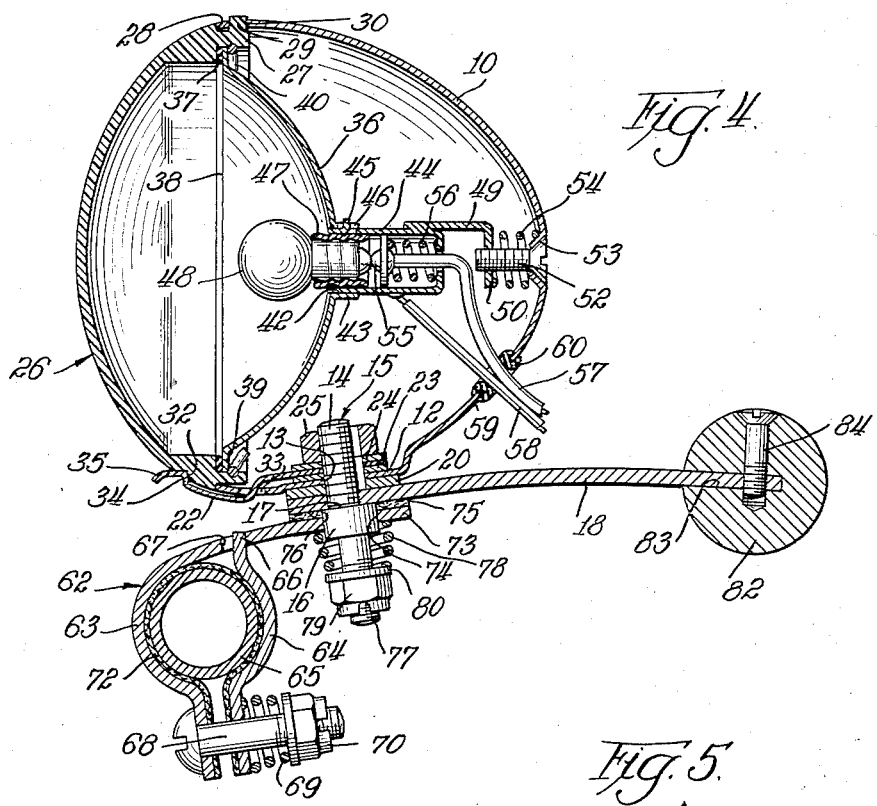
Figure 5:
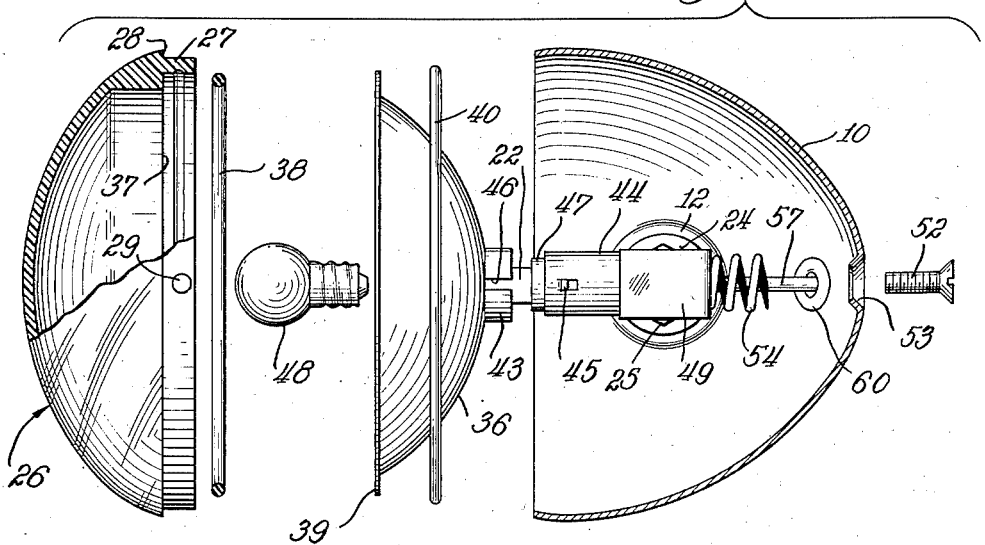

In the two sheets of drawings:

Fig. 1 is a side elevational view of a directed beam light unit embodying a preferred form of my invention and indicating its manner of mounting upon a cylindrical member, such as a handle bar of a bicycle or the like;

Figs. 2 and 3 are respectively top and end sectional views taken substantially on lines 2—2 and 3—3 of Fig. 1;

Fig. 4 is a vertical side sectional view of the light unit shown in Fig. 1 and depicts the parts thereof in their assembled relationships, and Fig. 5 is an exploded top view of parts of the light unit, with some of said parts broken away and shown in section, and which view indicates certain structural details and the order of assembly of the parts.

Referring to the exemplary embodiment of my invention which is shown in the accompanying drawings for illustrative purposes, a cup-type metal housing 10 has a smoothly curved sectional shape, as shown in Fig. 4, and is substantially circular in general form with respect to a longitudinal axis. A small portion 12 of the side area thereof is deformed from the generally smooth contours of the rest of the housing surface, however, to provide a flat space which, in the present instance, is at the bottom of the housing and accommodates a suitable mounting structure. Centrally of the flat portion 12, it is punched to provide an aperture 13 for receiving a threaded portion 14 of the mounting post 15.

Exteriorly of the housing 10, the mounting post 15 has an enlarged bearing portion 16 (Fig. 4) providing a shoulder 17 adjacent the threaded portion 14. By preference, my light unit is adjustable in transverse directions by manual movement of a handle 18. To facilitate the accomplishment of this result and to prevent rotation of the handle 18 relative to the mounting post 15, the threaded portion 14 of that post has a flat side 19 and fits into a complementarily shaped aperture in the handle 18, as depicted in Fig. 2. In the disclosed structure, a spacing washer 20 is disposed between the surface of the handle 18 and the flat portion 12 of the housing. Interiorly of the housing 10, a leaf type clip spring 22 is spaced from the housing by washer 23 and gripped between that washer and a washer 24. As shown in Fig. 4, the threaded portion 14 of the mounting post 15 extends through the handle 18, spacing washer 20, flat housing portion 12, washer 23, clip spring 22 and washer 24 and has a nut 25 threaded on to the end thereof to secure those parts together against the shoulder 17 of the mounting post.

A lens 26 having a concavo-convex sectional shape has a substantial cylindrical mounting rim 27 which fits quite snugly into the open front of the housing 10 and is provided with an exterior shoulder 28 adjacent the mounting rim, which shoulder abuts the front edge of the housing. Although the lens might be held in place with reference to the housing in various manners, I have provided a structure, in the present instance, which lends itself readily to quick and easy removal of the lens from the housing without the use of tools. As shown in Figs. 4 and 5, an integral retaining stud 29 projects laterally from the exterior surface of the mounting rim 27 at a position spaced from the shoulder 28. This stud fits into a complementary aperture 30 at a selected position spaced from the front edge of the housing 10.

At a position which is desirably diametrically opposed to the position of the retaining stud 29, the outer surface of the lens is notched to provide a latching shoulder 32 spaced forwardly and opposed to the shoulder 28. Leaf type clip spring 22 extends to the exterior of the housing from the mounting post 15 through an aperture 33 in the housing, which aperture is sufficiently large to permit free flexure of the extending end of the clip spring. Near the extending end, the clip spring 22 is formed to provide a latching shoulder 34 adapted to engage the shoulder 32 on the exterior lens surface, whereby to grip the lens and hold it firmly in position against the edge of the housing. Preferably, an end 35 of the clip spring projects outwardly in angular relationship from the exterior surface of the lens to facilitate the manual release of the clip spring for the removal of the lens. It may be readily understood that when the latching shoulder of the clip spring is released from the lens, one side of the lens may be swung upwardly with respect to the housing to a position such that the removal of the retaining stud 29 from its retaining aperture may be readily effected.

For various reasons, it is my preference that the lens 26 shall be moulded of a transparent plastic materal, and particularly of a plastic material which possesses a well known property of some such materials, to effectively bend light rays passing therethrough. One reason for my preference toward a moulded plastic lens is that such materials may be moulded to a desired shape and with dimensional limits that remain within quite close limits of variation. Another reason for my preference of a plastic material, and particularly those having the light ray bending characteristics mentioned, is that the lens may be given a substantial curvature so as to project considerably in front of the housing and thereby emit a substantial quantity of side light readily visible to others than the one using the light unit.

The disclosed lens has a smoothly curved exterior surface which not only comes into flush relationship with the exterior surface of the housing to provide a pleasing and streamlined appearance, but has the forward projection of the lens from the housing somewhat exaggerated for the reason mentioned by the approach of the marginal portion of the lens surface within less than 30 degrees of parallelism with the longitudinal axis of the lens.

In addition to the foregoing features and advantages of the disclosed housing and lens structures, they also lend themselves to assembly of the internal light unit parts in a manner effecting the provision of additional features and advantages. For instance, the lens and a reflector 36 form parts of a subassembly and carry the internal parts of the light unit in a manner such that they are removable together. Adjacent the mounting rim 27 of the lens, I have provided an internal shoulder 37. The latter shoulder provides an abutment for a sealing washer 38 which is preferably made of a flexible and resilient material, such as rubber, and, in the present instance, has a normally circular section as depicted in Fig. 5, which sectional shape is somewhat flattened by firm engagement with a peripheral mounting flange 39 on the reflector 36. The interior surface of the lens mounting rim 27 is peripherally grooved at a distance from the internal shoulder 37 so as to receive and hold a resilient and split snap ring 40 as depicted in Fig. 4. The snap ring 40 holds the reflector 36 in its asembled relationship with the lens 26 and maintains firm engagement of the sealing washer 38 between the shoulder 37 of the lens and the mounting flange 39 on the reflector. The snap ring 40 being within the housing 10 when the lens is in the assembled relationship to the housing, it may be observed that removal of the lens from the housing is required to effect disassembly of other parts of the light unit. On the other hand, the disclosed structure not only provides a waterproof closure for the light unit, but also affords ready access to all of the parts upon disassembly, and eliminates the necessity of a lens holding bezel, screw fasteners and the like.

The interior surface of the reflector 36 is concave, and in the assembly it faces the concave interior surface of the lens. Centrally of the reflector, it is provided with a socket opening 42 which, in the disclosed type of light unit having provision for focusing, is surrounded by a rearwardly projecting flange 43. A tubular socket holder 44 is slidable longitudinally within the reflector opening 42 and has an integrally formed lug 45 projecting radially from the outer surface thereof and disposed for sliding movement in a slot 46 in the flange 43. Screwed in the front end of the socket holder 44 is a socket 47 adapted to receive and hold a standard type of light bulb 48. In the present instance, the socket is threaded to receive a light bulb having a threaded base.

A bracket 49 is secured to, and projects rearwardly from the rear end of the tubular socket holder 44 and has a portion 50 spaced from the end of the socket holder into which an adjusting element, such as a screw 52, is threaded. The screw 52 extends through an axial opening 53 in the housing 10 and is thus exposed for adjustment of the axial position of the light bulb 48 relative to the front surface of the reflector 36. A compression spring 54 is disposed between the portion 50 of the bracket 49 and the interior of the housing to bias the socket holder forwardly to the extent permitted by the adjustment of the screw 52. For effecting ease of assembly, the compression spring 54 may be soldered or otherwise fastened to the portion 50 of the bracket.

Within the socket holder, a contact element 55 is mounted for longitudinal sliding movement and is biased forwardly to a position for engagement with the light bulb by a compression spring 56. Insulated connecting wires 57 and 58 are electrically connected to the contact element 55 and socket holder 44, and extend outwardly through an opening 59 in the housing, which opening desirably carries a grommet 60.

The light unit, thus constructed, and having the mounting post 15 secured thereto and projecting from the exterior of the housing 10, is supported for adjustment in transverse planes in response to manual movement of the handle 18 by a clamp 62. That clamp, in my preferred structure, includes two clamping elements 63 and 64 oppositely curved to grip the cylindrical surface of a handle bar 65 or the like therebetween. At one end, the clamping element 64 has a lug portion 66 disposed in an aperture 67 in the clamping element 63 to provide a separable hinge connection between those elements. The other ends of the clamping elements are disposed in spaced and opposed relationship and have a screw 68 extending therethrough. A compression spring 69 surrounding a portion of the screw and disposed between the end of the clamping element 64 and nut 70 provides adjustable resilient means for maintaining a predetermined gripping force upon the gripping elements. By preference, a liner 72 of a material such as fiber which provides good frictional engagement but prevents scratching or marring of the bar 65, is utilized within the clamping elements 63 and 64. This liner has end tabs through which the screw 68 extends to hold it in position. The clamping element 63 has a projecting end portion 73 in which a bearing bore 74 is provided to receive the bearing portion of the mounting post 15.

A washer 75, preferably made of a non-metallic material such as fiber, is disposed between the surfaces of the handle 18 and the projecting portion 73 of the clamping element 63. The washer 75 has an opening 76 therein which is of sufficient size to surround the bearing portions 16 of the mounting post. On the end of the bearing portion 16 of the mounting post opposite the threaded portion 14, the mounting post has a threaded extension 77 which carries a compression spring 78 and has a nut 79 and a washer 80 thereon; the spring 78 being disposed between the surface of the projecting portion 73 and the washer 78, so that adjustment of the nut 79 varies the frictional force of the handle 18 and extending portion 73 against opposite faces of the washer 75. Thus, in addition to being manually adjustable about the axis of the handle bar 65 in a vertical plane, the direction of the rays from my light unit may also be adjusted in a lateral plane about the axis of the mounting post 15. Springs, in each instance, are utilized in the disclosed structure to provide effective clamping pressure for holding the light in an adjusted position, while allowing ready manual movement about the respective axes.

By preference, a knob 82 has a slot 83 therein and is screwed to the projecting end of the handle 18 by fastening means such as a screw 84 to provide a neat and effective grip.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a directed beam light unit for mounting on a member having a cylindrical outer surface, the combination comprising a housing carrying a lens and a reflector in opposed relationship, and means providing a swivel support for the housing and upon which said housing is adjustable in transverse directions, said means including a clamp having parts hingedly connected together and oppositely curved to fit against opposite sides of the cylindrical outer surface of said member, adjustable spring means for urging said parts toward one another at a distance from the hinge connection thereof so as to effect gripping action of the parts, a lining of relatively flexible fiber material disposed between and forming a gripping lining for the parts, one of said parts having an extending end portion bored to provide a bearing, a handle having arm and grip portions, a stud having opposed end portions, one of which is non-rotatably secured to said housing and to one end of the arm portion of the handle so that the grip portion thereof is spaced from the housing, said stud having an enlarged bearing portion thereon between said opposed end portions and fitting into the bearing of said extending end portion of one of the clamp parts, said enlarged bearing portion providing a shoulder against which the handle is gripped and located, a fiber washer disposed between said handle and said extending end portion of one of the clamp parts, and spring means mounted on the end portion of the stud opposite the housing for urging the handle and said extending end portion of one of the clamp parts into frictional engagement with said fiber washer.

FRANK W. SCHWINN.

REFERENCES CITED

The following references are of record in the file of this patent:

UNITED STATES PATENTS

| Number | Name | Date |
|---|---|---|
| 609,558 | Rosenbluth | Aug. 23, 1898 |
| 1,335,146 | Young | Mar. 30, 1920 |
| 1,404,281 | Duffy | Jan. 24, 1922 |
| 1,509,783 | Schnell | Sept. 23, 1924 |
| 1,705,065 | Neil | Mar. 12, 1929 |
| 1,786,814 | Arbuckle | Dec. 30, 1930 |
| 2,135,263 | Sisson | Nov. 1, 1938 |
| 2,185,600 | McComb | Jan. 2, 1940 |
| 2,249,858 | Schwinn | July 22, 1941 |
| 2,252,950 | Seiss | Aug. 19, 1941 |
| 2,273,130 | Meyerhoefer | Feb. 17, 1942 |

FOREIGN PATENTS

| Number | Country | Date |
|---|---|---|
| 477,072 | Great Britain | Dec. 21, 1937 |